(12) United States Patent
Kurti et al.

(10) Patent No.: US 8,325,417 B1
(45) Date of Patent: Dec. 4, 2012

(54) APPARATUS AND METHOD FOR PRODUCING AN ANNULAR FAR-FIELD PATTERNED BEAM(S)

(75) Inventors: Ralph Steven Kurti, Ridgecrest, CA (US); Michael Johnny Wardlaw, King George, VA (US); Ramesh Kumar Shori, Burbank, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 798 days.

(21) Appl. No.: 12/164,530

(22) Filed: Sep. 23, 2008

(51) Int. Cl.
*G02B 5/30* (2006.01)
(52) U.S. Cl. .................................. 359/483.01
(58) Field of Classification Search .................. None
See application file for complete search history.

(56) References Cited

U.S. PATENT DOCUMENTS

| | | | |
|---|---|---|---|
| 4,698,816 A * | 10/1987 | Chun | 372/19 |
| 5,677,755 A * | 10/1997 | Oshida et al. | 355/53 |
| 6,317,450 B1 * | 11/2001 | Reeder | 372/100 |
| 6,392,800 B2 | 5/2002 | Schuster | |
| 7,090,964 B2 * | 8/2006 | Baba-Ali et al. | 430/311 |
| 7,110,623 B1 * | 9/2006 | Kalibjian | 385/11 |
| 7,151,632 B2 | 12/2006 | Biss et al. | |
| 7,190,521 B2 * | 3/2007 | Hasman et al. | 359/569 |
| 7,245,356 B2 * | 7/2007 | Hansen | 355/67 |
| 7,248,769 B2 | 7/2007 | Michaloski | |
| 7,602,474 B2 * | 10/2009 | Mori et al. | 355/71 |
| 2005/0128458 A1 * | 6/2005 | Blatchford | 355/71 |
| 2005/0237509 A1 * | 10/2005 | Blatchford | 355/71 |
| 2006/0250600 A1 * | 11/2006 | Tsuji | 355/71 |
| 2006/0268408 A1 * | 11/2006 | Toussaint et al. | 359/487 |
| 2008/0143993 A1 * | 6/2008 | Shiozawa et al. | 355/71 |

* cited by examiner

*Primary Examiner* — Derek S Chapel
(74) *Attorney, Agent, or Firm* — Christopher L. Blackburn

(57) ABSTRACT

A phased array of Gaussian beams was used to form an annular far-field pattern as opposed to the normal peaked pattern in most phased arrays. This annular pattern arises from the radial symmetry of the polarization in each beam. Beams opposite one another in the annulus are polarized in the same direction but are 180° out of phase. This causes the center portion of the beam to be a null rather than a peak.

20 Claims, 13 Drawing Sheets

APPARATUS AND METHOD FOR PRODUCING AN ANNULAR FAR-FIELD PATTERNED BEAM(S)

STATEMENT REGARDING FEDERALLY SPONSORED RESEARCH OR DEVELOPMENT

The invention(s) described herein may be manufactured and used by or for the government of the United States of America for governmental purposes without the payment of any royalties thereon or therefore.

FIELD OF THE INVENTION

This invention relates to the formation of a composite laser beam(s) that exhibit(s) a far field intensity pattern having a central null, as opposed to a central peak.

BACKGROUND

Coherently phased arrays have been in use in radar systems for many years. In these radar systems the phase of two or more antennas are locked together and the ensemble forms a diffraction pattern that can be altered by changing the antenna spacing, antenna amplitude, and relative phase relationships Analogous optical systems have recently been formed by actively or passively locking the phases of two or more identical optical beams. By adjusting the relative phases of each beam, the diffraction pattern formed by the optical ensemble can be changed.

The ability to adjust the intensity pattern of light in the far field simply by changing the relative phase or intensity has tremendous utility. Two useful consequences of this phase-intensity relationship are far-field beam steering and synthetic aperture shaping. Beam steering using phase control gives the possibility of fast, non-mechanical beam deflection. Synthetic aperture devices can be used to dynamically control focal length, multiple beams from the same aperture, and aberration correction all of which arise from the ability to arbitrarily control far-field intensity patterns using spatially registered phase control.

Phase control of coherent arrays is the most common method of far-field intensity shaping, but polarization control also plays a role in the intensity distribution. Standard coherently combined arrays employ beams which are all polarized along the same axis. In this case the polarization is simply a necessary condition for achieving a phased array. However if one allows the polarization to become a parameter, other possibilities arise.

One of the possibilities of polarization control in addition to phase control is the ability to form what are referred to here as discrete cylindrical vector (DCV) beams. Cylindrical vector (CV) beams have characteristics that distinguish them from Gaussian beams. Among these characteristics is a non-uniform polarization state across the beam. Namely, the polarization of CV beams vary uniformly around the center of the beam and can be radially polarized, azimuthally polarized, or some combination of the two. Additionally, CV beams have a characteristic null in the center of the beam which is required by the cylindrical symmetry. Applications of CV beams range from mitigation of thermal effects in high power lasers and laser machining to particle acceleration interactions. They can even be used to generate longitudinal electric fields when tightly focused due to the cylindrical symmetry of the polarization, and although they are typically formed in free space laser cavities using some variation of an axicon, they can also be formed and guided in fibers.

Typical methods for creating CV beams fall into two categories. The first category of techniques uses an intracavity axicon in a laser resonator to generate a CV mode. The second category starts with a single beam and rotates the polarization of portions of the beam to create an inhomogeneously (typically radially or azimuthally) polarized beam. This second method is used by Biss et al. in U.S. Pat. No. 7,151,632. The second method is also used by Schuster in U.S. Pat. No. 6,392,800 to create a minimally perturbative transformation from a single uniformly polarized beam to a radially polarized beam for microlithographic projection.

A method performed in accordance with the principles of the present invention introduces a third possibility for creating CV beams. The said method uses multiple beams to produce a composite beam which approximates a CV beam. A great utility offered by this novel method is that it can be used to generate discrete CV beams synthetically by, among other things, superimposing an array of distinct beams having successively varying polarization, as is described in detail infra. The pattern of beams is an approximation to a CV beam. Some of the advantages of a synthetically created CV beam are similar to the advantages of synthetic aperture radar over earlier radar techniques. For example, a synthetically generated CV beam created using a method in accordance with the principles of the present invention (a DCV beam) exhibits many of the features as any other type of phased array, such as dynamically controlled beam steering, aberration correction, etc.

SUMMARY

The present invention relates to a method of producing a discrete cylindrical vector beam. The method involves providing multiple beams. The multiple beams are manipulated to produce a least three manipulated beams. The manipulated beams are distributed in the near field such that the composite near field intensity distribution of said manipulated beams has a central null. Each manipulated beam is provided the same shape as each other manipulated beam. Each manipulated beam is provided with the same wavelength as each other manipulated beam. The manipulated beams are oriented in the near field such that each of said manipulated beams is uniformly distributed on the perimeter of a circle having a selected radius. Each of the manipulated beams is provided a polarization that differs from the polarization of its adjacent manipulated beams by an amount equal to 360 degrees divided by a total number of manipulated beams. The manipulated beams are propagated such that each manipulated beam is parallel to each other manipulated beam. The propagated manipulated beams produce a discrete cylindrical vector beam having a composite far field intensity distribution having a central null It is to be understood that the foregoing general description and the following detailed description are explanatory only and are not to be viewed as being restrictive of the present invention, as claimed. Other features, embodiments, and aspects of a method performed in accordance with the principles of the present invention will become apparent after a review of the following detailed description of the disclosed embodiments, theoretical background, the drawings, and claims.

DETAILED DESCRIPTION

Figure 1:
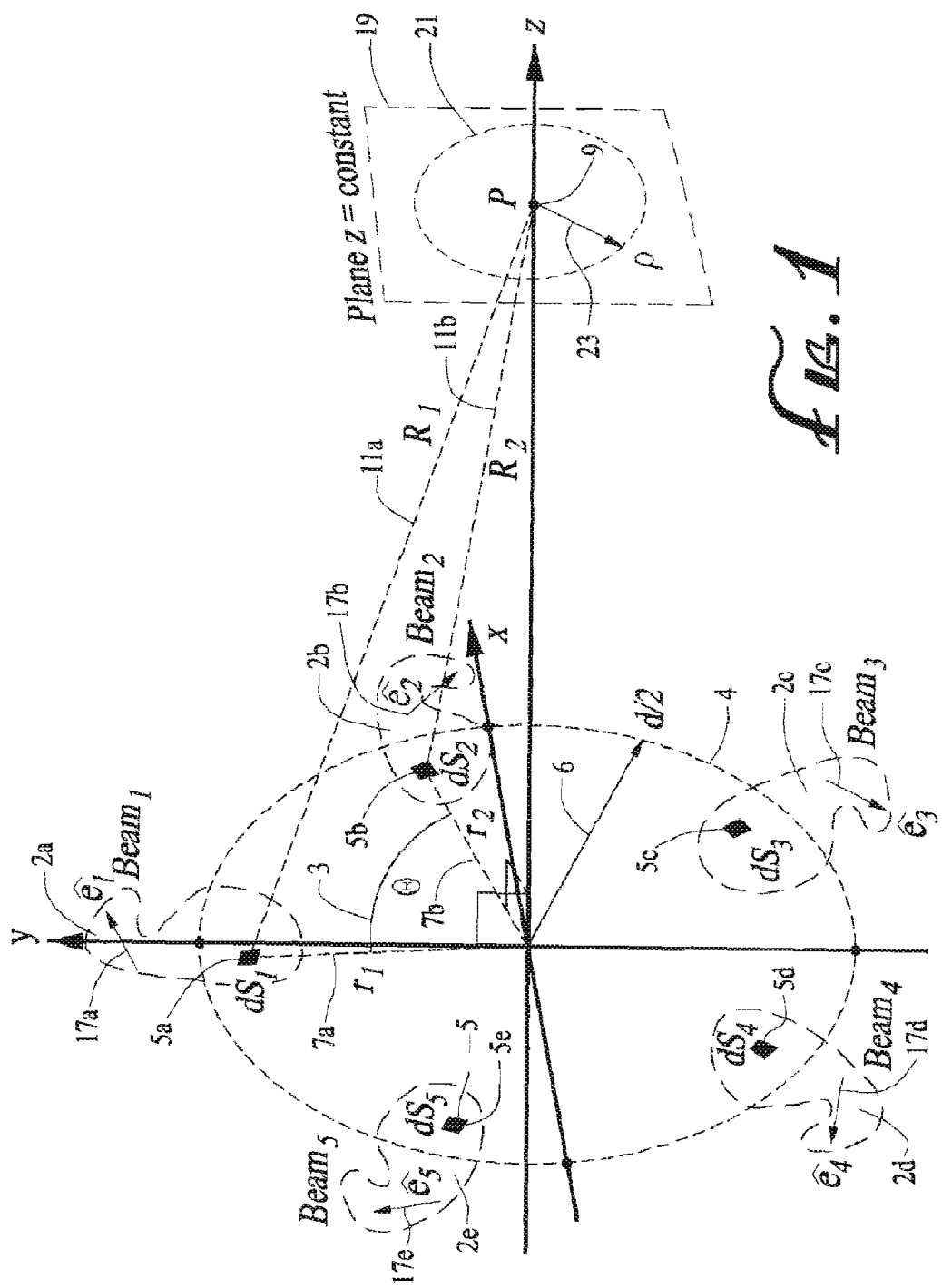
FIG. 1. Figure one is a near field cross sectional view of one possible embodiment of five manipulated beams produced in accordance with the principles of the present invention, located on the perimeter of a circle.
Figure 2:
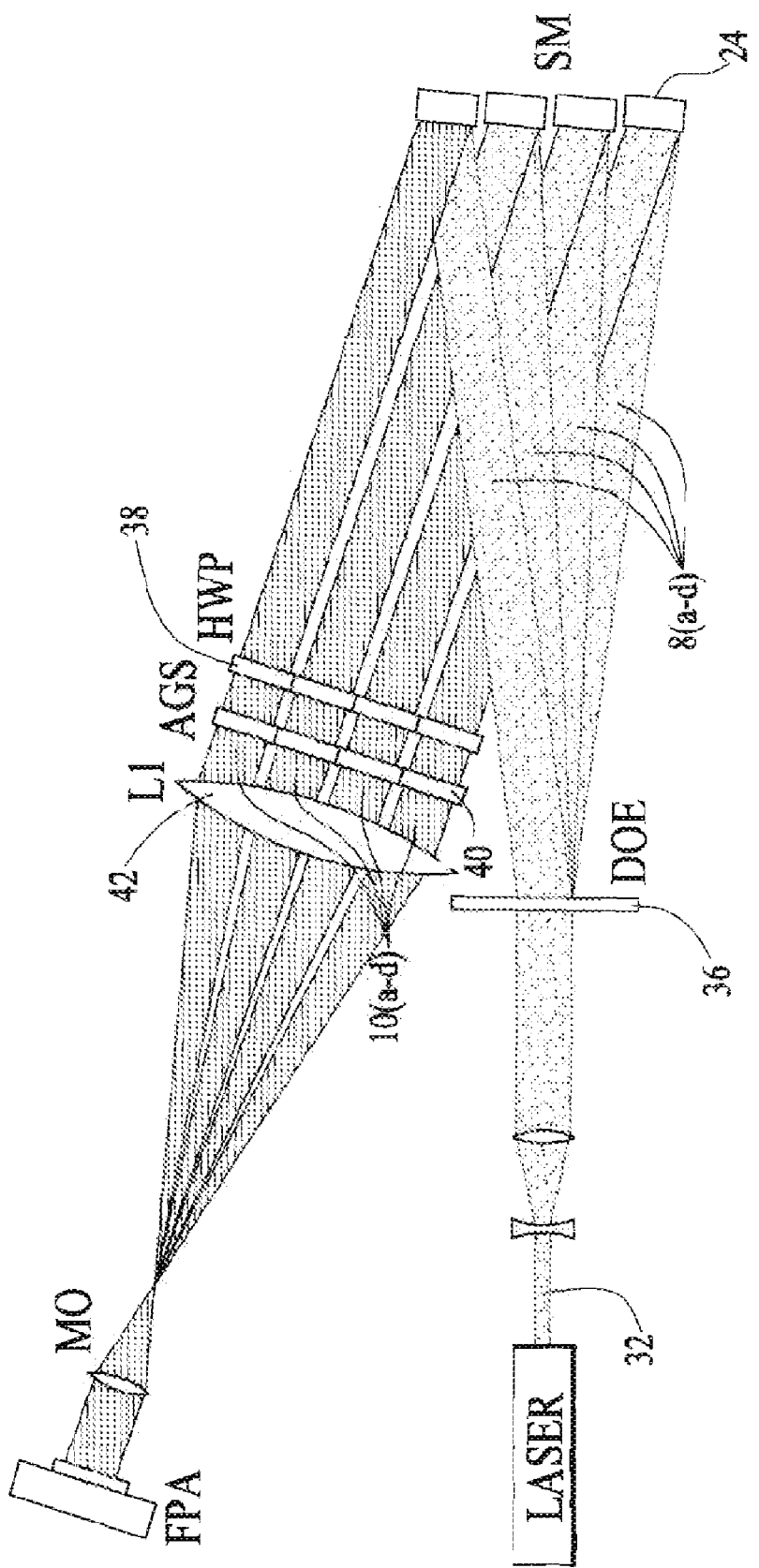
FIG. 2 is an illustration of one possible embodiment of an apparatus that could be used to perform a method in accordance with the principles of the present invention; however for ease of illustration, the manipulated beams are shown in a plane rather than oriented uniformly on the perimeter of a circle as is required by the principles of the present invention.

One embodiment of a method practiced in accordance with the principles of the present invention involves providing at least three multiple beams (4 multiple beams are represented by lines in FIG. 2, 8(a-d)—however, any number of at least three multiple beams can be used in accordance with the principles of the present invention) and manipulating the multiple beams to produce at least three manipulated beams FIG. 1, 2 (a-e); FIG. 2, 10 (a-d) (Note that FIG. 1 and FIG. 2 show five and four manipulated beams respectively; however, any quantity of three or more manipulated beams may be used in accordance with the principles of the present invention). FIG. 1 illustrates a cross section of manipulated beams in the near field 2 (a-e). The shape, number, type, source, and other aspects of the multiple beams and manipulated beams FIG. 1, 2 (a-e) may vary from those illustrated in accordance with the principles of the present invention, unless otherwise specified in this specification or required by principles or science or practice.

Each of the manipulated beams FIG. 1, 2 (a-e) is provided with the same phase as each of the other manipulated beams, meaning that $\phi_n = \phi_m$ for any pair of manipulated beams n and m.

Each of the manipulated beams FIG. 1, 2 (a-e) is provided with the same wavelength as each of the other manipulated beams FIG. 1, 2 (a-e).

Each of the manipulated beams FIG. 1, 2 (a-e) is provided a polarization $\hat{e}_n$ that varies from the polarization of each other manipulated beam FIG. 1, 2 (a-e). Specifically, the polarization $\hat{e}_n$ of each manipulated beam varies FIG. 1, 2 (a-e) by 360 degrees divided by a total number of manipulated beams FIG. 1, 2 (a-e) from that manipulated beam's adjacent manipulated beams. For instance, in FIG. 1, Beam 1's (2a) polarization would vary by 72 degrees (equivalent to 360 degrees divided by 5—the total number of manipulated beams in the illustrated embodiment of manipulated beams in the near field) from the polarization of each of Beams 2 (2b)

and 5 (2*e*). Each manipulated beam has two adjacent manipulated beams. For the purposes of this specification, including the claims, a first manipulated beam is adjacent to a second manipulated beam if the distance between the first manipulated beam and the second manipulated beam is no greater than the distance between the second manipulated beam and any other manipulated beam when the distance is measured along the perimeter of the circle (4) on which the manipulated beams 2 (*a-e*) lie in accordance with the principles of the present invention. For the purposes of this specification, including the claims, each manipulated beam has exactly two adjacent manipulated beams along the perimeter of the said circle.

Each of the manipulated beams FIG. 1, 2 (*a-e*) is provided the same geometrical shape as each of the other manipulated beams. FIG. 1 illustrates one possible orientation of manipulated beams 2 (*a-e*) having a non cylindrically symmetrical geometry. However, the manipulated beams 2 (*a-e*) may have any geometrical shape, including cylindrically symmetrical shapes.

The manipulated beams FIG. 1, 2 (*a-e*) are uniformly distributed on the perimeter of a single circle having a selected radius. Manipulated beams are "uniformly distributed" on the perimeter of a circle (separated from each other by 360 degrees divided by the number of manipulated beams), for the purposes of this specification including the claims, when, for each manipulated beam, the distance between a manipulated beam and its two adjacent multiple beams is the same where the distance between manipulated beams is measured around the perimeter of the circle.

The manipulated beams are oriented on the perimeter of said circle such that the perimeter of the circle passes through an identical portion of each of said manipulated beams. FIG. 1 illustrates a cross section of one possible embodiment of five manipulated beams 2 (*a-e*) distributed evenly on the perimeter of a single circle 4 having a radius d/2 (6). As can be seen from FIG. 1, the perimeter of the circle passes through an identical portion of each of said manipulated beams. In FIG. 1, the manipulated beams 2 (*a-e*) do not have a cylindrically symmetrical geometry, are oriented on the perimeter of a single circle 4 with a radius d/2 (6), and are uniformly distributed on the circle's perimeter 4. However, a method performed in accordance with the principles of the present invention may include manipulated beams FIG. 1, 2 (*a-e*) having any geometry, including hexagonal, rectangular, and square, as well as an arbitrary shape. Further, a method performed in accordance with the principles of the present invention includes providing distribution and orientation for the manipulated beams FIG. 1, 2 (*a-e*) such that they are uniformly distributed and oriented on the perimeter of a circle with any selected radius (See FIG. 1) (so long as the rest of the requirements are met—for example, the radius cannot be so small that the near field composite intensity distribution of the manipulated beams does not have a central null).

Figure 3:
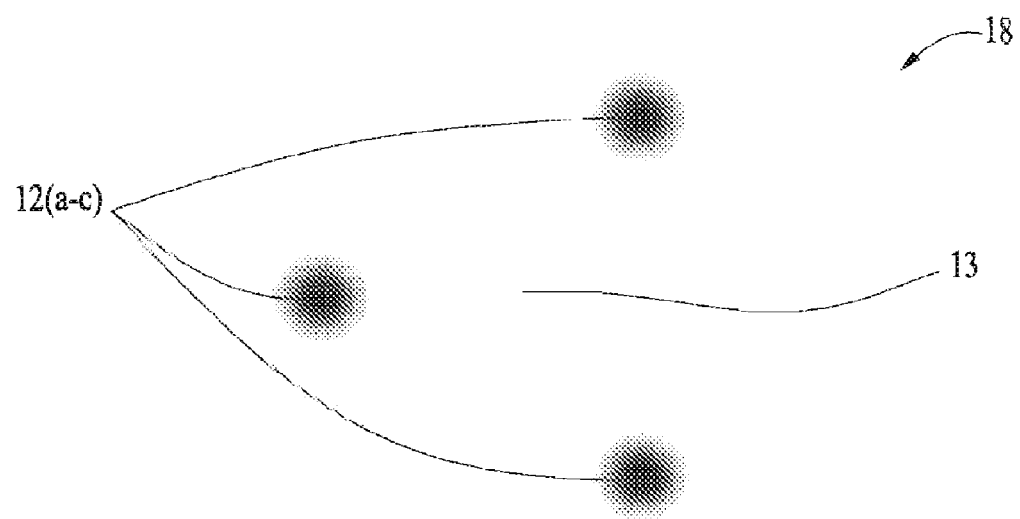
FIG. 3 illustrates a near field intensity distribution of each of a possible embodiment of three manipulated beams, and a near field composite intensity distribution of one embodiment of three manipulated beams (including a central null), generated in accordance with the principles of the present invention.
Figure 4:
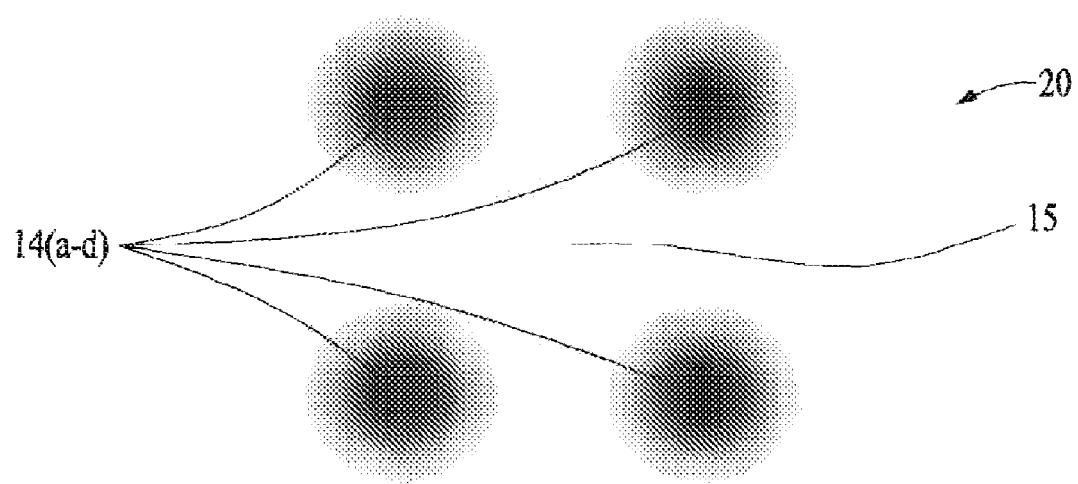
FIG. 4 illustrates a near field intensity distribution of each of a possible embodiment of four manipulated beams, and a near field composite intensity distribution of one embodiment of four manipulated beams (including a central null), generated in accordance with the principles of the present invention.
Figure 5:
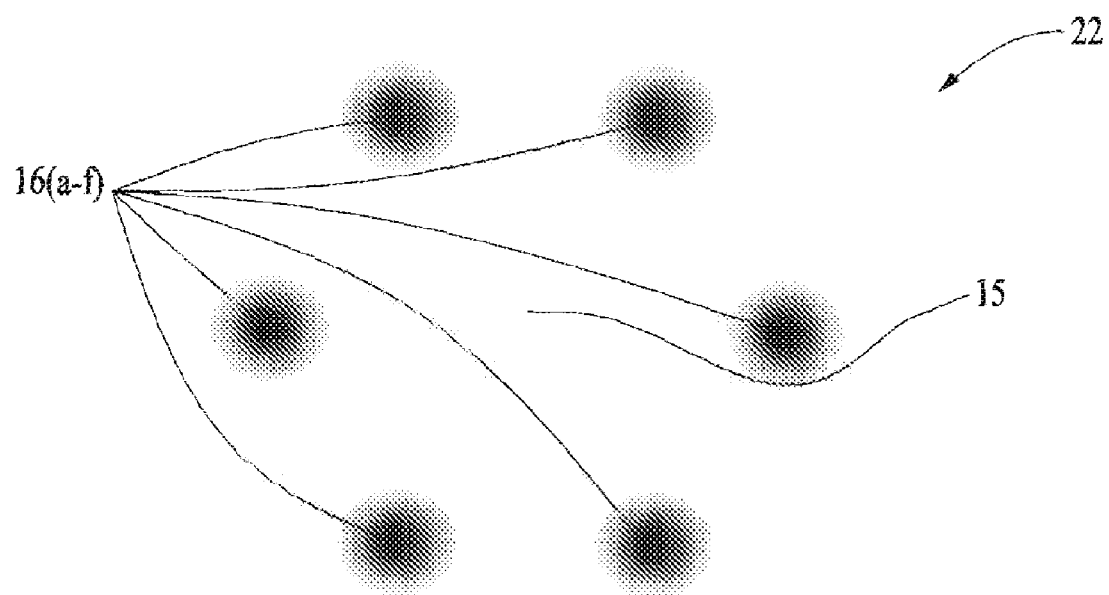
FIG. 5 illustrates a near field intensity distribution of each of a possible embodiment of six manipulated beams, and a near field composite intensity distribution of one embodiment of six manipulated beams (including a central null), generated in accordance with the principles of the present invention.

The manipulated beams FIG. 1, 2 (*a-e*) are further distributed such that their composite near field intensity distribution has a central null. The radius of said circle may affect whether the composite intensity distribution has a central null. FIGS. 3, 4, and 5 illustrate the composite near field intensity distribution (18, 20, 22) of one possible embodiment of three, four, and six manipulated beams respectively. The near field composite intensity distribution (18, 20, 22) of the four manipulated beams in the near field has a central null FIG. 5, 15. The central null in FIG. 5 (15) consists of an area.

Each manipulated beam FIG. 1, 2 (*a-e*) is made to be parallel to each other manipulated beam. Multiple beams (multiple beams are represented by lines in FIG. 2, 8 (*a-d*)) manipulated to yield manipulated beams FIG. 1, 2 (*a-e*); FIG. 2, 10 (*a-d*), or manipulated beams, can be made parallel to each other by any conventional means. In one embodiment of a method practiced in accordance with the principles of the present invention, the multiple beams FIG. 2, 8 (*a-d*) are made parallel using a segmented mirror (SM) 24. In reality (or practice) a perfectly parallel set of manipulated beams leading to a composite DCV beam cannot be created due to the finite precision of any laboratory equipment, but in practice beams can be made sufficiently parallel to create a functional DCV beam. As such, the use of the term parallel in this specification, including the claims, does not require perfect parallelism; the quality of the DCV beam will depend on the accuracy with which each individual manipulated beam is made parallel to the other manipulated beams. Similar statements may be made about each of the quantities and requirements involved in creating a DCV beam (for example, phasing, wavelength, intensity, distribution and orientation are all subject to limitations of equipment).

The manipulated beams (which at this point have the same shape, same wavelength, same overall intensity, are in phase with each other, have been provided with differing polarizations as described and intensity distributions, are parallel to each other, and lie on the perimeter of a circle with said orientation on said circle) are propagated to yield a composite beam. The composite beam has a far field composite intensity distribution. The far field composite intensity distribution has a central null. A composite beam is the sum of the light from the array of manipulated beams FIG. 1, 2 (*a-e*), and it is considered to be a single entity. A composite beam created using the principles of the present invention approximates a cylindrical vector beam in the far field. As initially separate beams are used to produce a composite beam approximating a cylindrical vector beam, the cylindrical vector beam approximated in accordance with the principles of the present invention is referred to as a discrete cylindrical vector beam (DCV beam) in this specification including the claims.

Figure 16:
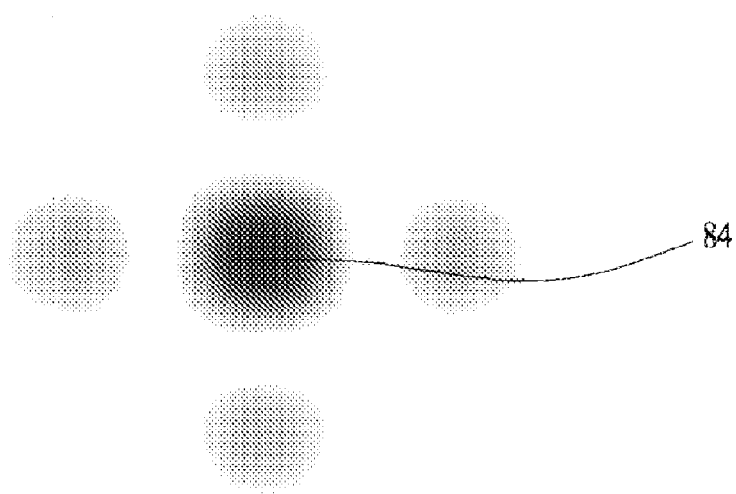
FIG. 16 shows a simulation of the composite intensity distribution formed when four beams are propagated to produce far field effects when the near field beams all have the same polarization rather than the polarization arrangement required by the principles of the present invention.
Figure 19:
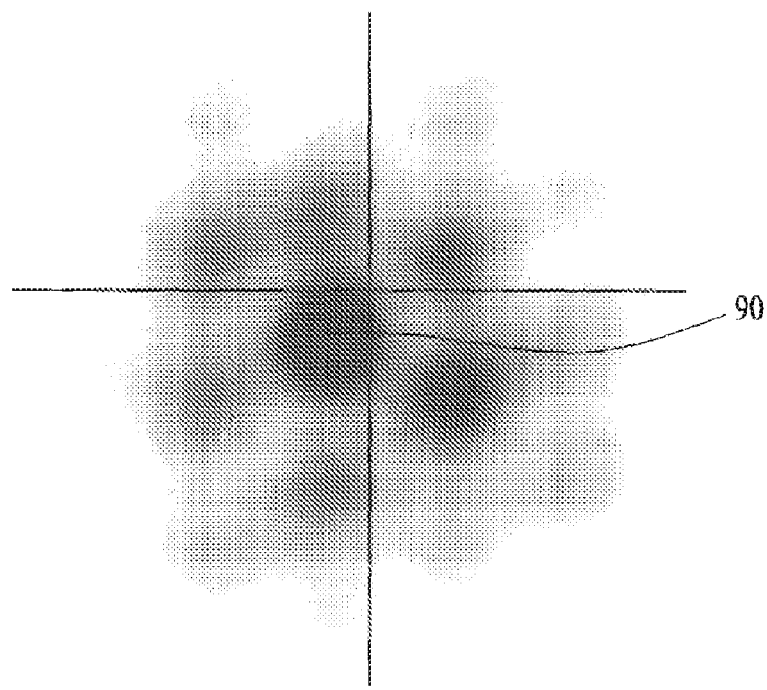
FIG. 19 is an experimentally derived image of a far field composite intensity distribution formed using standard methods of coherently combining six near field beams with all having the same polarization rather than the polarization arrangement required by the principles of the present invention, the composite beam does not have a central null.
Figure 18:
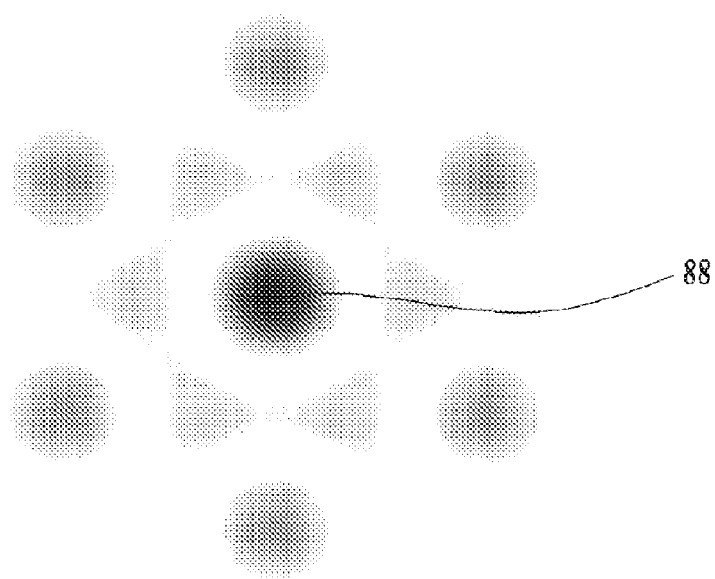
FIG. 18 shows a simulation of the composite intensity distribution formed when six beams are propagated to produce far field effects when the near field beams all have the same polarization rather than the polarization arrangement required by the principles of the present invention.

FIGS. 3, 4, and 5 illustrate the intensity distribution of one possible embodiment of three, four, and six manipulated beams in the near field (FIG. 3, 12 (*a-c*); FIG. 4, 14 (*a-d*); FIG. 5 16 (*a-f*), respectively), as well as the near field composite intensity distribution of one embodiment of three, four, and six manipulated beams (FIG. 3, 18; FIG. 4, 20; FIG. 5, 22, respectively).

Figure 6:
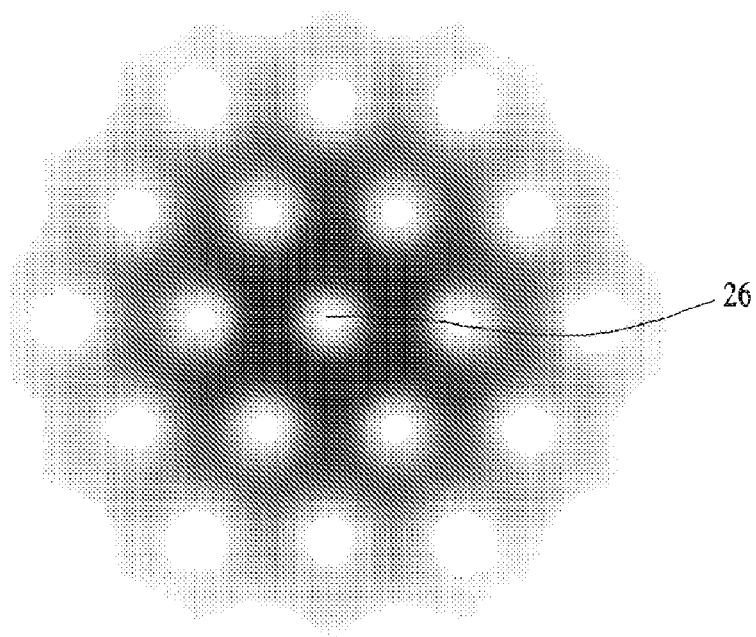
FIG. 6 shows a simulation of a possible composite intensity distribution of a discrete cylindrical vector beam formed using one embodiment of three manipulated beams in accordance with the principles of the present invention.
Figure 7:
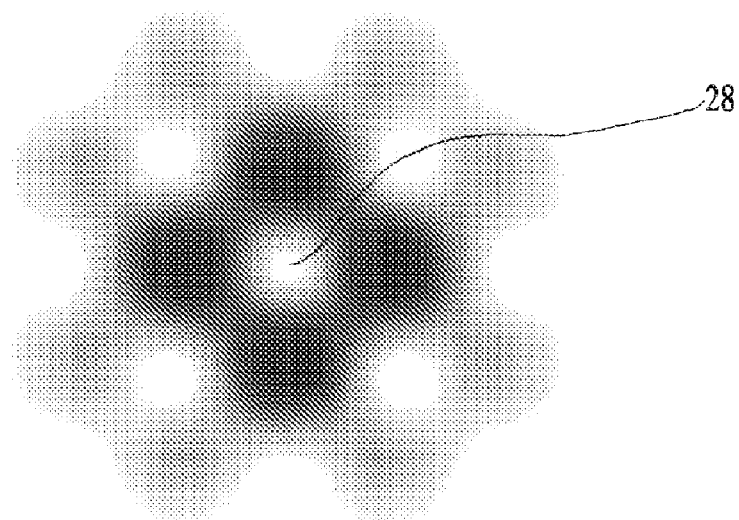
FIG. 7 shows a simulation of a possible composite intensity distribution of a discrete cylindrical vector beam formed using one embodiment of four manipulated beams in accordance with the principles of the present invention.
Figure 8:
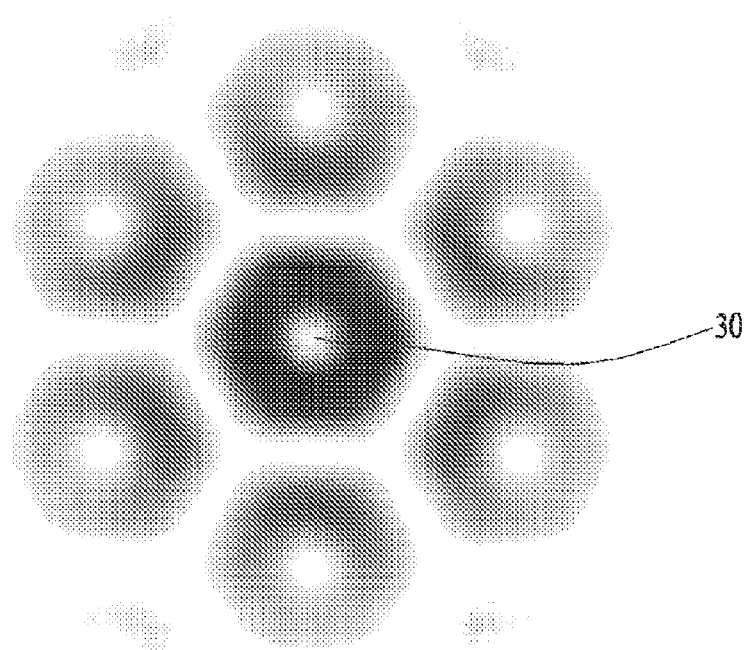
FIG. 8 shows a simulation of a possible composite intensity distribution of a discrete cylindrical vector beam formed using one embodiment of six manipulated beams in accordance with the principles of the present invention.

The far field composite intensity distributions of some possible composite beams produced using some possible embodiments using three, four, and six manipulated beams are shown in FIGS. 6, 7, and 8. The on axis fluence goes to zero at all points along the z-axis, producing a central null (See FIG. 6, 26; FIG. 7, 28; FIG. 8, 30). On the z-axis, the distance from each aperture to any one point on the axis is always the same, and as mentioned previously, the phase is the same for each manipulated beam FIG. 1, 2 (*a-e*); FIG. 2, 10 (*a-d*).

FIG. 2 illustratively shows one possible apparatus constructed to practice one embodiment of a method in accordance with the principles of the present invention; the apparatus is used to provide and manipulate multiple beams 8 (*a-d*) to produce manipulated beams FIG. 2, 10 (*a-d*). For illustrative purposes, FIG. 2 does not illustrate manipulated beams that are oriented around the perimeter of a circle as is required by the principles of the present invention.

In this particular embodiment, four manipulated beams are produced (represented by the lines in FIG. 2, 10 (*a-d*)); however, any number of manipulated beams greater than or equal to three may be used in accordance with the principles of the present invention.

In this particular embodiment, the beam from the continuous wave Nd:YAG doubled to 532 nm FIG. 2, 32 was expanded by means of a telescope (TS) to a diameter of about 1 cm. Any conventional beam source may be used. Further, any conventional beam diameter may be used. This beam is directed through a diffractive optical element (DOE) 36 which creates an 8×8 array of beams. Use of a diffractive optical element to provide multiple beams 8 (*a-d*) from a single beam is merely provided as an example. Any method of providing multiple beams 8 (*a-d*) can be used in accordance with the principles of this invention.

In this particular embodiment, each of the multiple beams that exits the DOE 36 has the same characteristics—geometry, wavelength, phase, intensity, polarization—as the input beam except that the propagation vector of each of the multiple beams 8 (*a-d*) is slightly different. This gives rise to a diverging array of identical multiple beams 8 (*a-d*). Further, in this particular embodiment, four beams are selected from the beams exiting the diffractive optical element (from the 8*8 array) oriented such that they form a diverging 2 beam by 2 beam array. Those beams, which are propagating in a diverging square, are reflected and made parallel by a segmented mirror (SM) 24, thereby providing four identical and parallel beams distributed and oriented uniformly around the perimeter of a single circle. Any conventional method of making parallel the multiple beams 8 (*a-d*) or otherwise providing parallel manipulated beams may be used.

It is worth noting that in this embodiment, the intensity distribution (or shape of the beam) in the near field is cylindrically symmetrical. As such, the manipulated beams in this embodiment, unlike the manipulated beams shown in FIG. 1, 2 (*a-e*), did not need to be in effect rotated with respect to the z-axis in order to have the perimeter of the circle pass through an identical portion of the manipulated beams.

In this particular embodiment, after the multiple beams have been made parallel they pass through a set of four ½ wave plates (HWP) 38 which are used to provide the described varying polarization for each manipulated beam. The manipulated beams then pass through articulated glass slides (AGS) 40 which are used to provide each of said beams with the same phase as each other of said beams, thereby yielding manipulated beams 10 (*a-d*).

For experimental purposes, the manipulated beams 10 (*a-d*) were focused by a transform lens 42 in order to simulate the far field composite intensity distribution at the lens focus. The lens 42 was used to focus the manipulated beams 10 (*a-d*) as a means for obtaining experimental data. Using a lens (L1) 42 to focus the manipulated beams 10 (*a-d*) is not a requirement for practicing a method in accordance with the principles of this invention. The lens was used merely for laboratory simplicity. This focal spot was then imaged onto a camera by a microscope objective (MO) to magnify the focal pattern.

Figure 9:
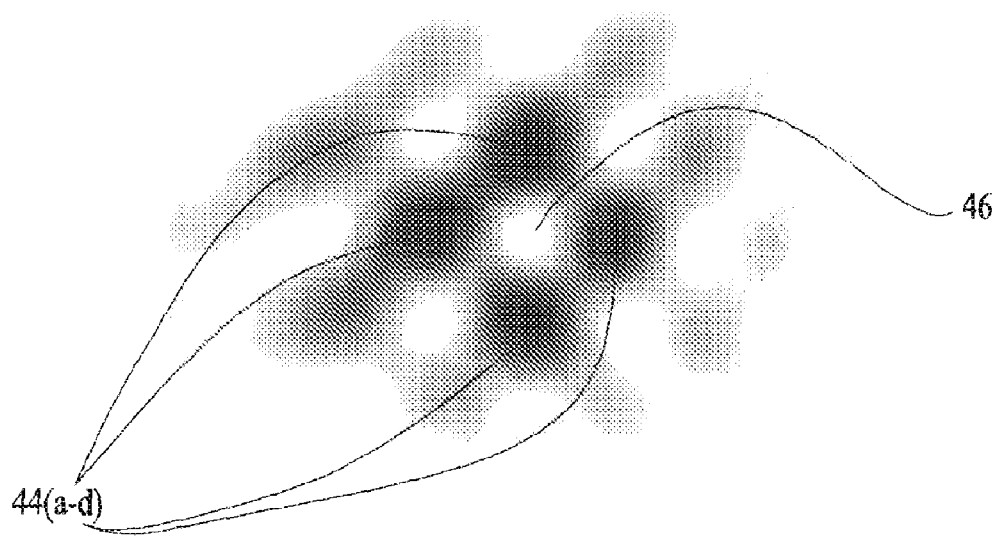
FIG. 9 is an experimentally derived image of a far field composite intensity distribution of a discrete cylindrical vector beam formed using one possible embodiment of four manipulated beams in accordance with the principles of the present invention, the discrete cylindrical vector beam having a central null in the far field.

FIG. 9 shows the results of the layout just described—a far field composite intensity distribution of the composite beam imaged during an experiment using the apparatus generally described above to perform one embodiment of a method in accordance with the principles of the present invention. There is a null at the center (46) in the far field surrounded by a square grid of peaks (48 (*a-d*)) having an intensity that decreases with increasing distance from the center.

Figure 10:
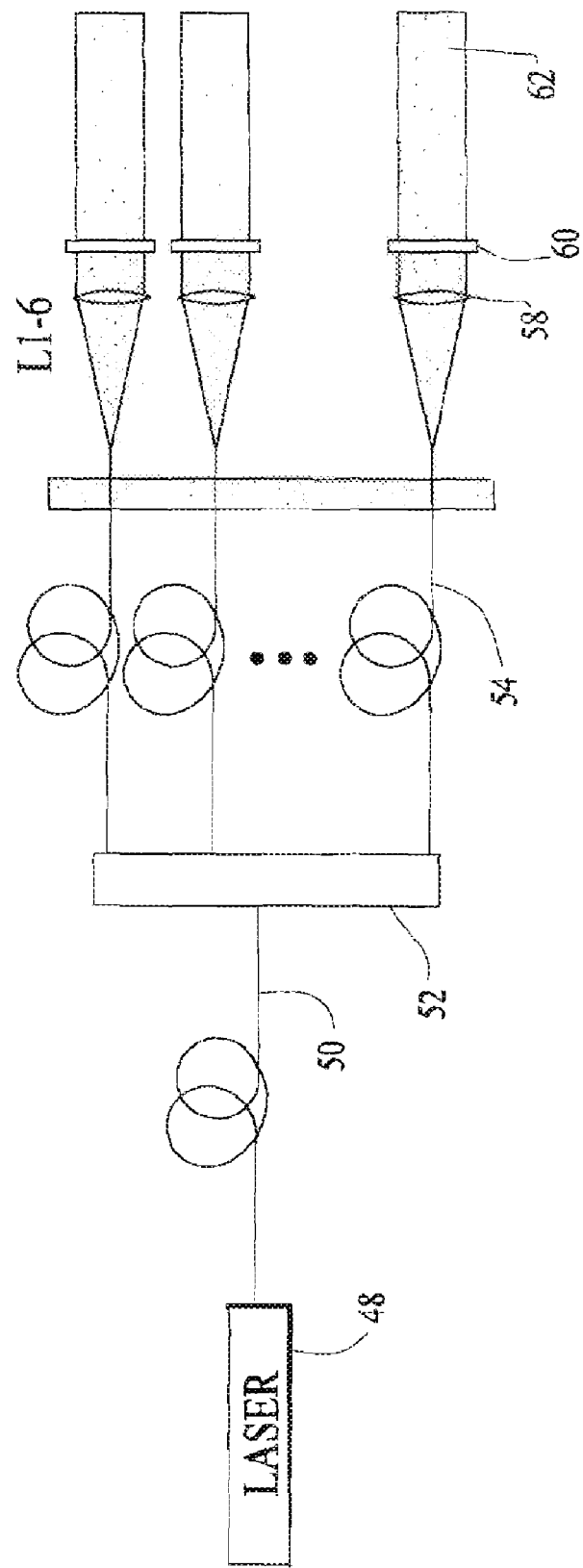
FIG. 10 is an illustration of the preferred embodiment of a layout based on fiber optic manipulation that may be used to perform a method according to the principles of the present invention.

Experiments were performed according to the principles of the present invention using three and six manipulated beams. The layout used during this experiment (FIG. 10) was one embodiment of a layout constructed to practice a method in accordance with the principles of the present invention. Many different components could be used in accordance with the principles of the present invention. In this particular embodiment, a continuous wave Nd:YAG laser (48) is coupled into a polarization maintaining single mode optical fiber (50). The signal is then directed through an eight channel Electro-optic Modulator (52) which creates eight copies of the original signal and provides phase and amplitude control on each channel. U.S. Pat. Nos. 7,187,492 and 7,058,098 provide additional detail regarding controlling and stabilizing the optical phase of multiple beams. Any conventional means of providing multiple beams and controlling their phase and amplitude may be used in accordance with the principles of the present invention. Each channel is then directed out of an optical fiber and collimated by a 1 inch lens (L1-6) 58. The lenses 58 are spaced about 0.020" (1.020" center-to-center) apart in a hexagonal layout. To adjust the focus and tip-tilt of each beam, a 5-axis stage (not shown) holds each fiber. The beams are then directed through six ½ wave plates 60 to provide the proper polarization, thereby yielding manipulated beams 62. The manipulated beams 62 were then directed through a five (5) inch transform lens with about a sixty inch focal distance (not shown). Finally, the focus spot is then imaged onto a camera by a microscope objective (not shown) in order to view the far field image.

Figure 11:
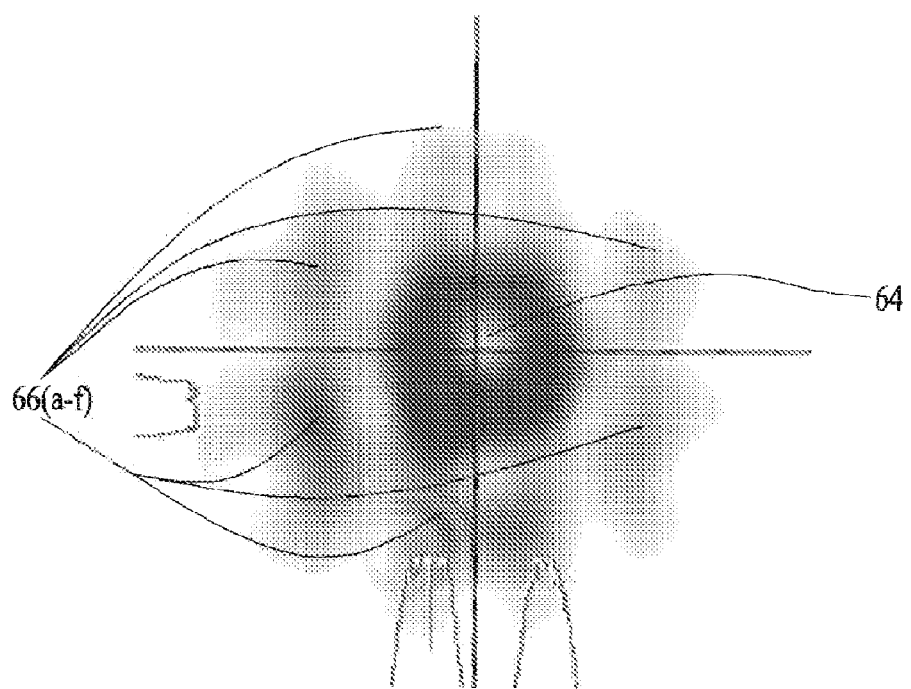
FIG. 11 is an experimentally derived image of a far field composite intensity distribution of a discrete cylindrical vector beam formed using one possible embodiment of six manipulated beams in accordance with the principles of the present invention, the discrete cylindrical vector beam having a central null in the far field.

FIGS. 3 and 5 show a composite near field intensity distribution of three and six manipulated beams. The simulation of a six beam layout configuration is shown in FIG. 8. The far field composite intensity distribution of a composite beam produced using six manipulated beams is shown in FIG. 11. For the axisymmetric polarization case (bottom), there is a null at the center (64) in the far field surrounded by a hexagonal ring and six more nulls (66 (*a-f*)) further from the center in a hexagonal grid. Notice also that there is still a reasonable correlation between the simulated far field patterns and the experimental far field patterns.

Figure 12:
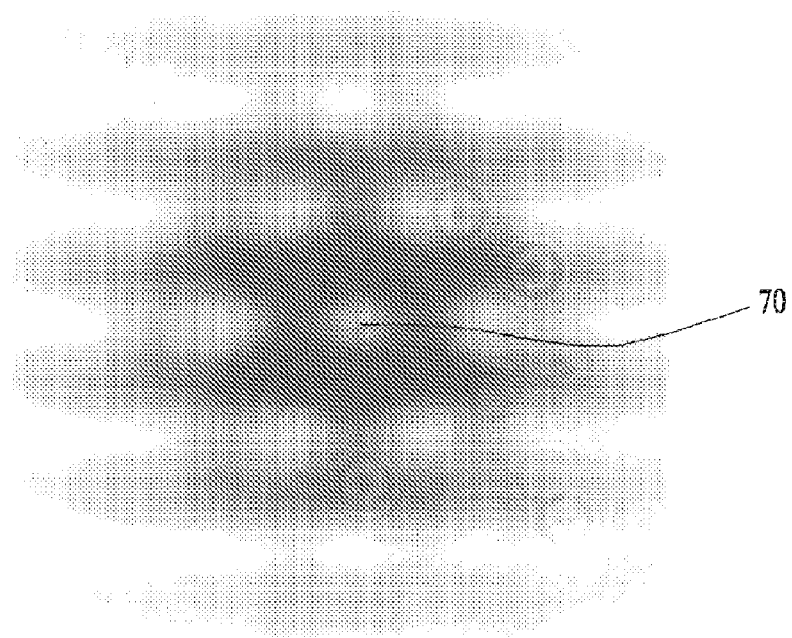
FIG. 12 is an experimentally derived image of a far field composite intensity distribution of a discrete cylindrical vector beam formed using one possible embodiment of three manipulated beams in accordance with the principles of the present invention, the discrete cylindrical vector beam having a central null in the far field.

The simulation of a three beam layout configuration is shown in FIG. 6. The far field composite intensity distribution of a composite beam produced using three manipulated beams is shown in FIG. 12. There is a null at the center (70). Notice also that there is still a reasonable correlation between the simulated far field patterns and the experimental far field patterns. However, the correlation is not as strong because this particular experiment did not have a well stabilized phase for each manipulated beam. Subsequent experiments will likely include a feedback system—similar to the systems described in U.S. Pat. Nos. 7,187,492 and 7,058,098—to maintain the proper phase relationships between each of the beams.

Theoretical Foundations:

Consider first the propagation of only the ith Gaussian beam of an array using rectangular coordinates. Assume that this beam has its waist at the origin, travels along the z axis, and has a frequency ω. It has a uniform polarization in the x-direction. Then the electric field of this wave as a function of position has the form $$E_i(\vec{x}) = \epsilon_i(\vec{x}) e^{i\omega t}, \tag{1}$$

where we define $$\varepsilon_i(\vec{x}) = A \frac{w_0}{w(z)} e^{i[kz - \tan^{-1}(z/z_0) + \phi']} e^{ik(\Delta x_i^2 + \Delta y_i^2)/2R(z)} e^{-(\Delta x_i^2 + \Delta y_i^2)/w^2(z)} \tag{2}$$

in which $\Delta x_i = x - x_i$ is the distance along the x axis from the center of beam i at z=0 to the point x, $\Delta y_i = y - y_i$ is the distance along the y axis from the center of beam i at z=0 to the point y, A is the amplitude of the field, $w_0$ is the standard Gaussian beam waist, $\phi'$ is the phase, $\lambda$ is the beam's wavelength, and $z_0$ is the Rayleigh range defined as $$z_0 = \frac{\pi w_0^2}{\lambda}. \quad (3)$$

$R(z)$ and $w(z)$ are defined as follows.

$$R(z) = z + \frac{z_0^2}{z} \text{ and} \quad (4)$$

$$w(z) = w_0\sqrt{1 + \frac{z^2}{z_0^2}}. \quad (5)$$

Since this beam is a Gaussian it remains a Gaussian as it propagates. Note also from the last exponential function that the width of the Gaussian extends in x and y as the beam propagates along the z axis. The consequence of this is that for $z \gg z_0$ equation [2] becomes $$\varepsilon_i(\vec{x}) = A\frac{z_0}{z}e^{i(kz-\phi)}e^{ik(x_i^2+y_i^2)/2z}e^{-z_0^2(x_i^2+y_i^2)/w_0^2 z^2}. \quad (6)$$

where $\phi = \phi' - \pi/2$.

Now if we take the case of 2 beams which are in phase (i.e. $\phi_1 = \phi_2 = \phi$) at $z=0$ with $x_i$ and $y_i$ coordinates $(1, 0)$ for beam 1 and $(-1, 0)$ for beam 2, then the total time averaged field will be $$\varepsilon_i(\vec{x}) = \varepsilon_1(\vec{x}) + \varepsilon_2(\vec{x}) \quad (7)$$

$$= A\frac{z_0}{z}e^{i(kz-\phi)}e^{iky^2/2z}e^{-z_0^2 y^2/w_0^2 z^2} \times$$

$$(e^{ik[(x-1)^2+y^2]/2z}e^{-z_0^2[(x-1)^2+y^2]/w_0^2 z^2} +$$

$$e^{ik[(x-1)^2+y^2]/2z}e^{-z_0^2[(x-1)^2+y^2]/w_0^2 z^2}).$$

Clearly if we look on axis we will find that the field is $$\delta(0,0,z) = 2\delta_1(0,0,z) = 2\delta_2(0,0,z) \quad (8)$$

which in the far field is clearly going to be nonzero. However if we take the same case with $\phi_1 = 0$ and $\phi_2 = \pi$, then the total time averaged field will be $$\varepsilon(\vec{x}) = \varepsilon_1(\vec{x}) + \varepsilon_2(\vec{x}) \quad (9)$$

$$= A\frac{z_0}{z}e^{ikz}e^{iky^2/2z}e^{-z_0^2 y^2/w_0^2 z^2} \times$$

$$(e^{ik(x-1)^2/2z}e^{-z_0^2(x-1)^2/w_0^2 z^2} +$$

$$e^{ik(x+1)^2/2z}e^{-z_0^2(x+1)^2/w_0^2 z^2}).$$

Then along the z axis, clearly $$\delta(0,0,z) = 0. \quad (10)$$

Since the intensity is proportional to the square magnitude of the electric field, the intensity will also be zero along the z axis. This is due to the fact that these two fields are out of phase and of equal magnitude along the z axis. The resulting field distribution is anti-symmetric, while for the previous case the resulting field is symmetric with respect to the y axis. Thus for any uniform distribution with an even number of beams, N, rotated by 360%, the intensity along the z axis will be zero. A generalization to odd numbers of beams and arbitrary intensity distributions follows.

To generalize the above result to an arbitrary number of beams with semi arbitrary near field intensity distributions, consider the following discussion. It is sufficient to consider a Huygens approach. In free space, light from a point source expands in a sphere and can be described by the wave equation in spherical coordinates $$\nabla^2 \psi = \frac{1}{r^2}\frac{\partial}{\partial r}\left(r^2\frac{\partial \psi}{\partial r}\right) = \frac{1}{v^2}\frac{\partial^2 \psi}{\partial t^2} \quad (11)$$

where r is the distance from the point source and t is the time. The form of the solution can be shown to be $$\psi(r,t) = \left(\frac{\varepsilon_0}{r}\right)e^{i(k\cdot r \pm \omega t)}, \quad (12)$$

where the constant $\delta_0$ is the source strength, k is the wave vector, and $\omega$ is the angular frequency. This is the basis for using the Huygens formalism which describes light as expanding spheres.

Consider then that a beam of predetermined wavelength, arbitrary shape, and arbitrary intensity distribution is placed on the perimeter of circle with radius d/2 in the x-y plane (z=0). Now consider an array of N such beams (for example, see the example for N=5 in FIG. 1), where N is an integer greater than or equal to three, evenly distributed on the perimeter of the circle 4 each oriented with the perimeter arc of the circle 4 passing through the same corresponding portion of each beam 2 (*a-e*). The angle 3 separating adjacent beams is $\theta_N = 360°/N$. The said beams must be parallel to each other and for this example are propagating along the z direction. Using the Huygens expanding sphere formalism for describing one such beam of light propagating in the z direction, an expression for the disturbance caused at a point, P, along the z axis can be written as $$E_n(z) = \iint_{\substack{beam \\ aperture}} \frac{\varepsilon_A(r_n,\theta_n)}{R_n}\hat{e}_n \, dS_n = \iint_{\substack{beam \\ aperture}} \frac{\varepsilon_A(r_n,\theta_n)}{\sqrt{r_n^2+z^2}}\hat{e}_n \, dS_n, \quad (13)$$

which is proportional to the electric field and in which we have chosen a cylindrical coordinate system. Here $\delta_A(r_n,\theta_n)$ is the strength per unit area (analogous to $\delta_0$ mentioned above) of the light from the nth beam 2 (*a-e*), $\theta_n = \eta^0 - 360° \cdot n/N$ is the angle from the x axis around the circle to the nth beam 2 (*a-e*), $\hat{e}_n$ 17 (*a-e*) is the polarization unit vector of the nth beam 2 (*a-e*), the beam aperture is the cross section of the nth beam 2 (*a-e*) in the z=0 plane, and $dS_n$ 5 (*a-e*) is an infinitesimal area for integration over the nth beam aperture. For simplicity $\delta_A(r_n,\eta_n)$ is taken to be a well behaved function. To find the complete on-axis disturbance from such an array at a distance z along the axis, one must calculate the sum of the individual disturbances $$E(z) = \sum_{n=1}^{N} E_n(z) = \sum_{n=1}^{N} \int\int_{\substack{bean \\ aperture}} \frac{\varepsilon_A(r_n, \theta_n)}{\sqrt{r_n^2 + z^2}} \hat{e}_n \, dS_n. \quad (14)$$

Figure 13:
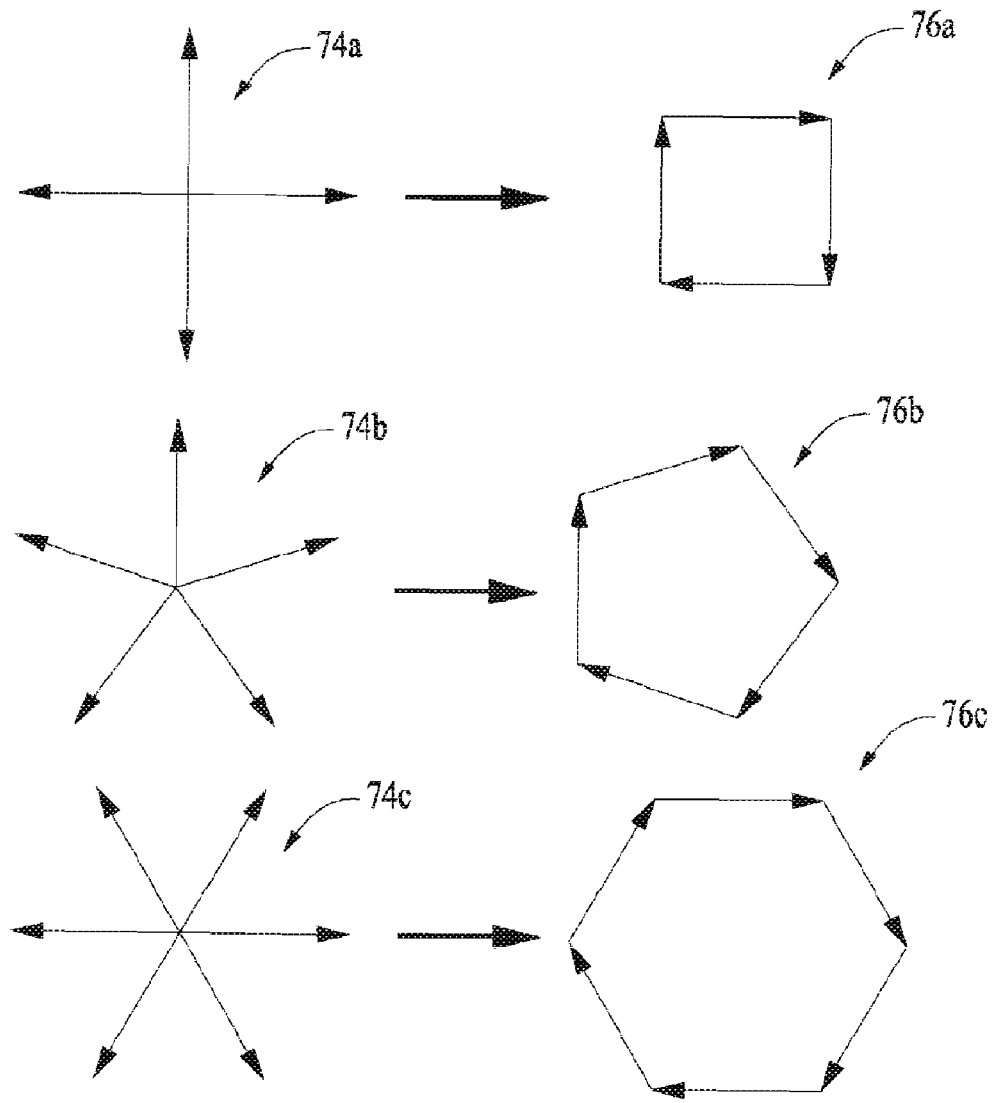
FIG. 13 is an illustration of how vectors may be rearranged and added to produce the cancellation which is required for the central null.

In general for x and y not on the z axis, this integration and summation would be complex to calculate, but because of the on-axis symmetry of the beam arrangement, simplifications can be made by choosing $dS_n$, 5 (*a-e*) to be in the same relative location in each aperture. Then $R_1=R_2=\ldots=R_n=R$ 11 (a and b) and by extension $r_1=r_2=\ldots=r_n=r$ 7 (a and b). It also can be seen that the integration over each aperture is identical, and thus the previous expression can be rewritten as $$E(z) = N \cdot \int\int_{\substack{bean \\ aperture}} \frac{\varepsilon_A(r_n, \theta_n)}{\sqrt{r_n^2 + z^2}} \left( \sum_{n=i}^{N} \hat{e}_n \right) dS. \quad (15)$$

where the expression in equation [14] has been multiplied by N and the summation is only over the unit vectors 17 (*a-e*) of the beams. The summation of the polarization unit vectors 17 (*a-e*) in this expression can be shown to cancel which causes $E(z)=0$ at any point along the positive z axis (i.e. the intensity on axis is zero creating a central null in the composite beam FIG. 6, 26; FIG. 7, 28; FIG. 8, 30; FIG. 9, 46; FIG. 11, 64; FIG. 12, 70). To more carefully consider this cancellation, refer to FIG. 13. The unit vectors of each beam are shown for the cases N=4 (74a), N=5 (74b), and N=6 (74c). By rearranging the unit vectors head-to-tail for the cases N=4 (76a), N=5 (76b), and N=6 (76c), it can be clearly seen that the polarization vectors cancel for N=4, 5, and 6. Since $\eta = \eta_0 - 360°/N$ is the formula both for the polarization unit vector of each succeeding beam rotated by $\eta_0$ as well as for the external angles of a regular polygon rotated by $\eta_0$, it is clear that this argument can be extended to any number of beams, N. Thus for the geometry described above for an arbitrary number of beams, $E(z)=0$ for any point along the z axis for $z>0$.

The disturbance created by the beams in the near field also goes to zero far from the z axis in a plane of constant z (FIG. 1, 19) containing point P (FIG. 1, 9). If we define $w_g(\eta,z)$ to be the generalized extent of an individual beam at a point $(r,\eta,z)$ such that the great majority of the beam falls within the boundary it defines, then clearly at any distance z along the axis, the disturbance $E(r, z)$ goes to 0 for $r \gg w_g(\eta,z)$.

The disturbance can also be shown to maintain its cylindrical symmetry in the plane where z is constant (FIG. 1, 19) containing point P (9). Consider a circle (21) of radius ρ (23) in the said plane (19). Temporarily ignoring the oscillatory nature of light, it can clearly be seen that contributions to the total disturbance from the $dS_n$'s 5 (*a-e*) at any point on the perimeter circle are strongest from the $dS_n$'s 5 (*a-e*) which are closer to the point on the perimeter (21) under consideration. Thus as one progresses around the perimeter of the circle (21) in the said plane (19), the cylindrical symmetry from the apertures at z=0 is imposed on the composite beam cross section at the said plane (19). Another way to express this observation is to say that in the absence of anything to break the symmetry, the cylindrical symmetry of the near field is carried on in the composite beam as it propagates.

A cylindrical vector or CV beam is a beam that has cylindrical symmetry. The discrete nature of the manipulated beams in the near field described in this Theoretical Background section will create oscillatory diffraction effects on the circle (FIG. 1, 21), but nevertheless the discrete cylindrical symmetry of the near field array yields a diffraction pattern that is zero on axis as well as far from the axis and maintains cylindrical symmetry—that is, it approximates an infinitely symmetric CV beam by using N discrete beams. These discrete cylindrical vector beams or DCV beams will approximate a CV beam with infinite-fold or continuous cylindrical symmetry. The quality of this approximation will depend on factors such as the number of elements, the near field fill factor of the beams, and the quality of the phasing of the beams.

The foregoing discussion did not limit the distance of point, P, from the array of beams at z=0. However in many practical situations, it is convenient to consider the far field images formed from beams which have relatively uniform phase across each aperture in the near field, commonly referred to as the beams being collimated. Point P is said to be in the far field when the distance between the array of beams in the near field at z=0 and P is greater than $a^2/\lambda$ where a is the aperture size of the array under consideration—in this case it is comparable to d (two times the radius d/2 in FIG. 1)—and λ is the wavelength of the propagating light. The shape of composite beams in the far field can be created at a much shorter distance by using a lens commonly referred to as a transform lens. By using a transform lens, far field measurements can be made at the focal plane of the lens. The near field refers to any point between the plane containing P and the plane defined by z=0 when the said point is close to the z=0 plane compared with the far field distance. It is convenient to consider composite beams in the far field because, other than continuing to expand with increasing z, the composite intensity distributions do not continue to evolve as z increases, while the composite distribution changes significantly between z=0 and the far field. With this description consider the following discussion of calculations and measurements done to verify the concepts herein described.

Figure 15:
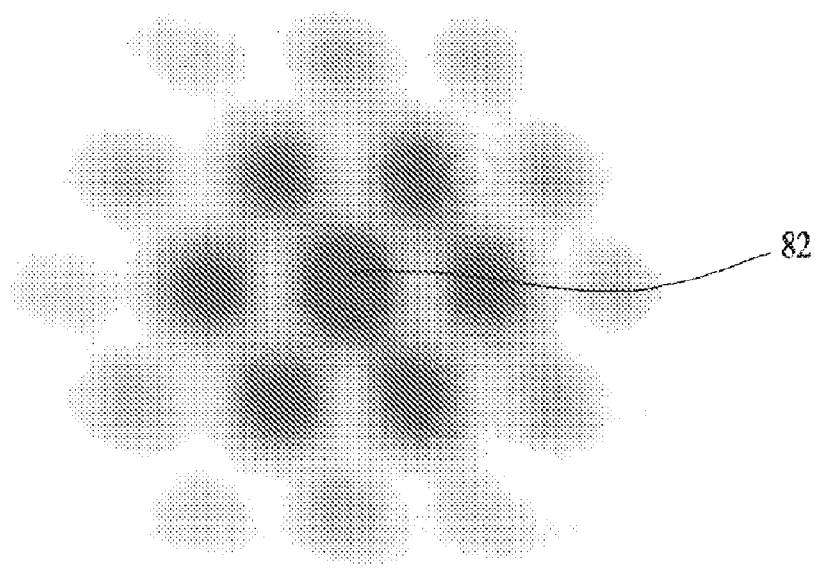
FIG. 15 is an experimentally derived image of a far field composite intensity distribution formed using standard methods of coherently combining three near field beams with all having the same polarization rather than the polarization arrangement required by the principles of the present invention, the composite beam does not have a central null.
Figure 14:
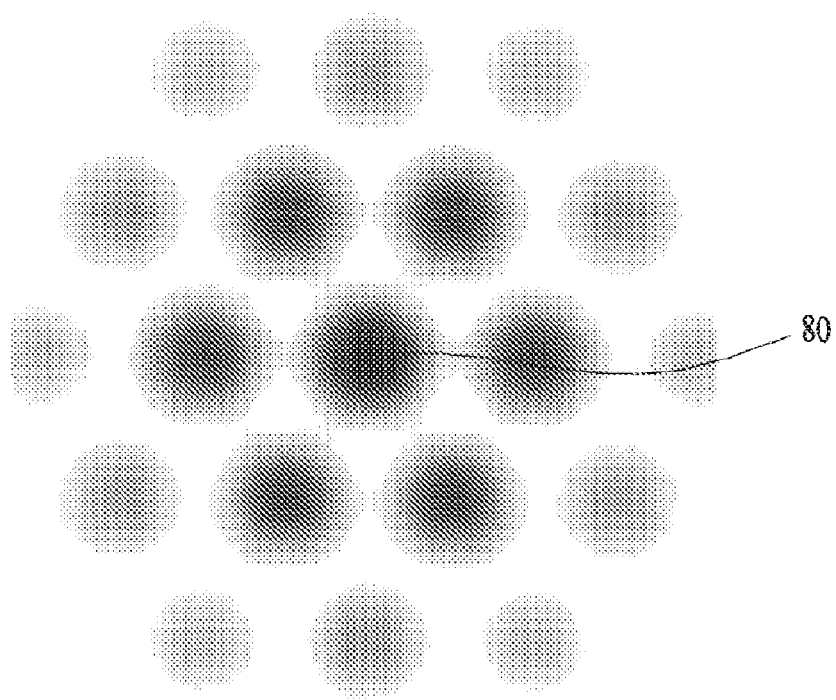
FIG. 14 shows a simulation of the composite intensity distribution formed when three beams are propagated to produce far field effects when the near field beams all have the same polarization rather than the polarization arrangement required by the principles of the present invention.
Figure 17:
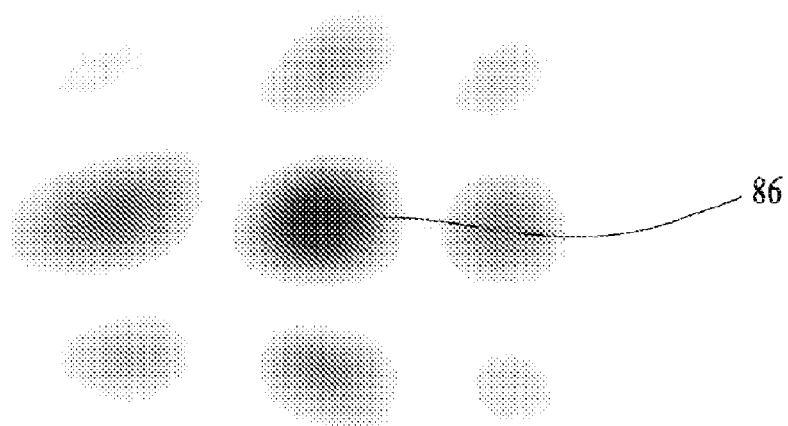
FIG. 17 is an experimentally derived image of a far field composite intensity distribution formed using standard methods of coherently combining four near field beams with all having the same polarization rather than the polarization arrangement required by the principles of the present invention, the composite beam does not have a central null.

FIGS. 14-19 illustrate the composite intensity distributions of composite beams which have a uniform linear polarization (unlike a composite beam produced in accordance with the principles of the present invention) lying along the same direction for each beam as in the example leading up to equation 8. Consider the case of three, four and six beams arranged with a near field composite intensity distribution similar to the one depicted in FIG. 3. In this example the wavelength λ of the light is about 1.06 nm, the distance d is about 7.62 cm, and the setup used for measurements is similar to the one shown in FIG. 10 with the far field conditions being created using a transform lens. For the case of three Gaussian beams polarized in the same direction (left-to-right), the calculated far field composite intensity distribution is depicted in FIG. 14 while the corresponding measured composite intensity distribution is depicted in FIG. 15. The centers of the composite intensity distributions depicted—both calculated and measured—are clearly maximum rather than null. However the DCV case with each beam having a uniform linear polarization along the direction from the center of the distribution outward (refer to FIG. 3), the calculated far field composite intensity distribution is depicted in FIG. 6 while the corresponding measured intensity distribution is depicted in FIG. 12. In this case, the centers of the far field composite distributions are clearly null rather than maximum. It should also be noted that in that particular embodiment, the standard far field composite intensity distributions are characterized by peaks in a hexagonal grid (FIGS. 14 and 15) while the DCV far field composite intensity distributions are characterized by nulls in a hexagonal grid (FIGS. 6 and 12). The cases for four and six beams were also tested and are shown in FIGS. 16-19. The case for six beams was identical to the case described above for three beams, while the case for four beams differed by having a distance d of about 2.41 cm and a setup similar to the one shown in FIG. 2. The case of four beams in the near field (FIG. 4) yields calculated and measured standard far field composite intensity distributions shown in FIGS. 16 and 17 respectively with calculated and measured DCV far field composite intensity distributions shown in FIGS. 7 and 9 respectively. The case of six beams in the near field (FIG. 5) yields calculated and measured standard far field composite intensity distributions shown in FIGS. 18 and 19 respectively with calculated and measured DCV far field composite intensity distributions shown in FIGS. 8 and 11 respectively. Again as with three beams, it should also be noted that the standard far field composite intensity distributions for four and six beams are characterized by peaks in the respective grid (FIGS. 16, 17, 18, and 19) while the DCV far field composite intensity distributions are characterized by nulls in the respective grid (FIGS. 7, 9, 8, and 11).

In the experimental and simulated cases, each beam was cylindrically symmetric. As such, the beams in the near field were not rotated by $\eta=360°/N$ since the cylindrical symmetry of each beam would be no different under rotations. Hence, it was sufficient to simply rotate the polarization of each beam. However an asymmetrical beam or a beam with lower symmetry might be required to be physically rotated as shown in FIG. 1 in order to satisfy the conditions to be a DCV beam. Some special cases clearly exist, such as using triangular beams where N=3, square beams where N=4, and hexagonal beams where N=6, etc. when the beams require only the polarization to be rotated providing the beams all have the same orientation and are evenly distributed around the perimeter of a circle at z=0. Again these simplifications arise from the inherent symmetry in each case while beams with no inherent symmetry would require rotation following the example in FIG. 1.

In addition to having a single DCV beam arising from a single near field array, it is possible to nest multiple concentric near field arrays to generate a more complex DCV beam. Namely, the existence of more than one concentric near field array each following the principles of the present invention still creates a DCV beam which is a mixture of the individual DCV beams arising from the individual concentric near field DCV arrays. This can be clearly seen by considering the following. Each DCV beam individually has a central null. If these central nulls are placed concentrically around a common axis, there will still exist a central null. Similarly, the intensity of each DCV beam will also go to zero at some distance from the axis which means that some $w_g(\eta,z)$ can still be created which will describe the size of the beam. The cylindrical symmetry of the total DCV beam will also be preserved since individually they are each concentric and cylindrically symmetric.

What is claimed is:

1. A process for producing annular far-field patterned beams, comprising:
    providing a plurality of optical beams;
    manipulating said plurality of optical beams;
    producing an odd-numbered plurality of manipulated beams from said plurality of optical beams;
    providing each of said odd-numbered plurality of manipulated beams a selected near field shape such that each of said odd-numbered plurality of manipulated beams has a near field geometry, wherein said near field geometry of each of said odd-numbered plurality of manipulated beams is the same;
    providing each of said odd-numbered plurality of manipulated beams a polarization that differs from the polarization of its adjacent of said odd-numbered plurality of manipulated beams by an amount equal to 360 degrees divided by a total number of said odd-numbered plurality of manipulated beams;
    providing each of said odd-numbered plurality of manipulated beams with a selected wavelength such that each of said odd-numbered plurality of manipulated beams has the same wavelength;
    providing each of said odd-numbered plurality of manipulated beams with a selected phase such that each of said odd-numbered plurality of manipulated beams is in phase with each other said odd-numbered plurality of manipulated beams;
    providing a distribution of said odd-numbered plurality of manipulated beams such that each of said odd-numbered plurality of manipulated beams is uniformly distributed on the perimeter of a single circle and the composite near field intensity distribution of said odd-numbered plurality of manipulated beams has a central null;
    orienting each of said uniformly distributed odd-numbered plurality of manipulated beams on the perimeter of said single circle such that the single circle passes through an identical portion of each of said odd-numbered plurality of manipulated beams' intensity distribution;
    propagating said odd-numbered plurality of manipulated beams having said near field distribution, said near field geometry, said wavelength, said polarization, said phase, said distribution and said orientation such that each of said odd-numbered plurality of manipulated beams is propagated in parallel with each other of said odd-numbered plurality of manipulated beams; and
    producing a composite beam comprising said odd-numbered plurality of manipulated beams, wherein said composite beam has a composite far field intensity distribution having a central null and discrete cylindrical symmetry.

2. The process of claim 1 wherein said odd-numbered plurality of manipulated beams comprises at least five manipulated beams.

3. The process of claim 1 further comprising the step of passing a single beam through a diffractive optical element to produce said plurality of optical beams wherein said plurality of optical beams comprises an array of beams.

4. The process of claim 1 wherein said near field geometry of said odd-numbered plurality of manipulated beams is a cylindrically symmetrical geometry.

5. The process of claim 1, wherein said odd-numbered plurality of manipulated beams is three odd-numbered plurality of manipulated beams.

6. The process of claim 1, wherein each of said plurality of optical beams is single mode Gaussian.

7. The process of claim 1, wherein each of said odd-numbered plurality of manipulated beams is single mode Gaussian.

8. The process of claim 6, wherein each of said odd-numbered plurality of manipulated beams is single mode Gaussian.

9. The process of claim 2, wherein each of said plurality of optical beams is single mode Gaussian.

10. The process of claim 2, wherein each of said odd-numbered plurality of manipulated beams is single mode Gaussian.

11. The process of claim 9, wherein each of said odd-numbered plurality of manipulated beams is single mode Gaussian.

12. The process of claim 3, wherein each of said plurality of optical beams is single mode Gaussian.

13. The process of claim 3, wherein each of said odd-numbered plurality of manipulated beams is single mode Gaussian.

14. The process of claim 12, wherein each of said odd-numbered plurality of manipulated beams is single mode Gaussian.

15. The process of claim 4, wherein each of said plurality of optical beams is single mode Gaussian.

16. The process of claim 4, wherein each of said odd-numbered plurality of manipulated beams is single mode Gaussian.

17. The process of claim 15, wherein each of said odd-numbered plurality of manipulated beams is single mode Gaussian.

18. The process of claim 5, wherein each of said plurality of optical beams is single mode Gaussian.

19. The process of claim 5, wherein each of said odd-numbered plurality of manipulated beams is single mode Gaussian.

20. The process of claim 18, wherein each of said odd-numbered plurality of manipulated beams is single mode Gaussian.

* * * * *